US012793343B2

(12) United States Patent
Lin et al.

(10) Patent No.: US 12,793,343 B2
(45) Date of Patent: Nov. 10, 2026

(54) DATA PROCESSING METHOD, APPARATUS, ELECTRONIC DEVICE, AND STORAGE MEDIUM

(71) Applicant: Lemon Inc., Grand Cayman (KY)

(72) Inventors: Kexin Lin, Los Angeles, CA (US); Xiaodong Song, Beijing (CN); Guangwei Wang, Beijing (CN); Min Xie, Beijing (CN); Yiling Chen, Los Angeles, CA (US); Yi Chen, Beijing (CN); Jie Liao, Los Angeles, CA (US); Yongjie Zhang, Beijing (CN); Jiaxin Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 108 days.

(21) Appl. No.: 18/840,057

(22) PCT Filed: Feb. 13, 2023

(86) PCT No.: PCT/SG2023/050076
§ 371 (c)(1),
(2) Date: Aug. 20, 2024

(87) PCT Pub. No.: WO2023/158376
PCT Pub. Date: Aug. 24, 2023

(65) Prior Publication Data

US 2025/0157149 A1 May 15, 2025

(30) Foreign Application Priority Data

Feb. 21, 2022 (CN) ......................... 202210158271.4

(51) Int. Cl.
*G06T 17/20* (2006.01)
*G06T 7/60* (2017.01)
*G06T 15/20* (2011.01)

(52) U.S. Cl.
CPC ................ *G06T 17/20* (2013.01); *G06T 7/60* (2013.01); *G06T 15/20* (2013.01); *G06T 2200/24* (2013.01); *G06T 2207/20092* (2013.01)

(58) Field of Classification Search
CPC .. G06T 17/20; G06T 7/60; G06T 7/80; G06T 15/04; G06T 15/20; G06T 2200/24;
(Continued)

(56) References Cited

U.S. PATENT DOCUMENTS 11,783,443 B2 * 10/2023 Holzer ...................... G06T 7/70
345/427
11,972,556 B2 * 4/2024 Holzer .................... G06T 7/001
(Continued)

FOREIGN PATENT DOCUMENTS

CN 108471495 A 8/2018
CN 109741404 A * 5/2019
(Continued)

OTHER PUBLICATIONS

European Patent Application No. 23756730.0; Extended Search Report; dated Apr. 23, 2025; 10 pages.
(Continued)

*Primary Examiner* — Wesner Sajous
(74) *Attorney, Agent, or Firm* — BakerHostetler

(57) ABSTRACT

The present disclosure provides a data processing method and apparatus, an electronic device and a storage medium. The method includes: when an instruction for acquiring a three-dimensional model corresponding to a target object is received, starting an acquisition unit; in response to meeting a preset acquisition condition, generating a three-dimensional grid to be processed that encloses the target object and displaying the three-dimensional grid to be processed on a display interface of a device to which the acquisition unit
(Continued)

belongs; and on the basis of a relative acquisition angle of the acquisition unit and said three-dimensional grid, adjusting target display information of a corresponding sub-grid in said three-dimensional grid.

20 Claims, 4 Drawing Sheets

(58) Field of Classification Search
CPC . G06T 2207/20092; G06T 2207/30252; G06T 2207/30208; G06F 30/15; G06F 17/00; G06F 3/048515
See application file for complete search history.

(56) References Cited

U.S. PATENT DOCUMENTS

| | | | | |
|---|---|---|---|---|
| 2020/0273205 | A1 * | 8/2020 | Yamashita | H04N 17/002 |
| 2020/0349757 | A1 * | 11/2020 | Holzer | G06T 17/20 |
| 2021/0334995 | A1 * | 10/2021 | Spence | G06T 7/60 |
| 2022/0028100 | A1 | 1/2022 | Doganis et al. | |

FOREIGN PATENT DOCUMENTS

| | | | | |
|---|---|---|---|---|
| CN | 111192362 A | | 5/2020 | |
| CN | 109741404 B | | 11/2020 | |
| CN | 112348958 A | * | 2/2021 | G06T 7/80 |
| CN | 112486318 A | | 3/2021 | |
| CN | 113850746 A | | 12/2021 | |
| JP | 2010-152535 A | | 7/2010 | |
| WO | WO 2021/213241 A1 | | 10/2021 | |

OTHER PUBLICATIONS

China Patent Application No. 202210158271.4; Office Action; dated Apr. 18, 2025; 17 pages.

Meng Lingkui et al.; "Grid-based 3D-Visualization and its Application for Water Resources"; China Water Resources; Jul. 2005; p. 50-54 (English Abstract on p. 54).

International Patent Application No. PCT/SG2023/050076; Int'l Search Report; dated Aug. 24, 2023;3 pages.

J. Ames; "How to Rotate Drawing Views in 3D"; https://web.archive.org/web/20230209122547/https://hawkridgesys.com/blog/solidworks-how-to-rotate-drawing-views-in-3d; Hawkridge Systems; Aug. 2019; accessed Aug. 2, 2024; 8 pages.

J. Pearson; "3 things you didn't know you could do in Solid Edge"; https://web.archive.org/web/20170728115226/https://www.design-engineering.com/3-things-you-didn%E2%80%99t-know-you-could-do-in-solid-edge-131168/; Feb. 2014; accessed Aug. 2, 2024; 9 pages.

* cited by examiner

DATA PROCESSING METHOD, APPARATUS, ELECTRONIC DEVICE, AND STORAGE MEDIUM

The present application is the U.S. National Stage of International Application No. PCT/SG2023/050076, filed on Feb. 13, 2023, which claims priority to Chinese Patent Application No. 202210158271.4, filed with the China National Intellectual Property Administration (CNIPA) on Feb. 21, 2022, which are incorporated herein by reference in their entireties.

TECHNICAL FIELD

The present disclosure relates to the technical field of computer processing, e.g., to a data processing method and apparatus, an electronic device, and a storage medium.

BACKGROUND

With the continuous progress of the three dimensional (3D) technology and the continuous perfection of related supporting resources, much convenience has been brought for users' life. For example, data may be acquired from an object at a plurality of angles so that a corresponding 3D model can be reconstructed from the acquired data. However, when the data is acquired, incomplete data may be acquired, resulting in an inaccurate reconstructed model.

SUMMARY

The present disclosure provides a data processing method and apparatus, an electronic device, and a storage medium to achieve the technical effects of improving data acquisition comprehensiveness and efficiency.

In a first aspect, the present disclosure provides a data processing method, comprising:

- starting an acquisition unit upon receiving an instruction for determining a three-dimensional model corresponding to a target object;
- when a preset acquisition condition is met, generating a three-dimensional grid to be processed enclosing the target object, and displaying it on a display interface of a device to which the acquisition unit belongs; and
- adjusting target display information of a corresponding sub-grid in the three-dimensional grid to be processed based on a relative acquisition angle between the acquisition unit and the three-dimensional grid to be processed.

In a second aspect, the present disclosure provides data processing apparatus, comprising an acquisition unit starting module, a three-dimensional grid to be processed display module and a target display information adjustment module.

The acquisition unit starting module is configured to start an acquisition unit upon receiving an instruction for determining a three-dimensional model corresponding to a target object.

The three-dimensional grid to be processed display module is configured to, when a preset acquisition condition is met, generate a three-dimensional grid to be processed enclosing the target object and display it on a display interface of a device to which the acquisition unit belongs.

The target display information adjustment module is configured to adjust target display information of a corresponding sub-grid in the three-dimensional grid to be processed based on a relative acquisition angle between the acquisition unit and the three-dimensional grid to be processed.

In a third aspect, the present disclosure provides an electronic device, comprising:

- at least one processor; and
- a memory configured to store at least one program.

The at least one program, when executed by the at least one processor, causes the at least one processor to implement the above data processing method.

In a fourth aspect, the present disclosure provides a storage medium, with computer-executable instructions stored thereon, wherein the computer-executable instructions, when executed by a computer processor, cause the computer processor to implement the above data processing method.

In a fifth aspect, the present disclosure provides a computer program product, comprising a computer program carried on a non-transitory computer-readable storage medium, wherein the computer program comprises program codes for performing the above data processing method.

DETAILED DESCRIPTION

Embodiments of the present disclosure will be described in more detail below with reference to the accompanying drawings. Although certain embodiments of the present disclosure are illustrated in the accompanying drawings, it should be understood that the present disclosure may be embodied in various forms and should not be construed as limited to the embodiments set forth herein, but rather, these embodiments are provided for a more thorough and complete understanding of the disclosure. It should be understood that the drawings and examples of the present disclosure are for exemplary purposes only and are not intended to limit the scope of the present disclosure.

The various steps recited in the method implementation of the present disclosure may be executed in a different order, and/or in parallel. Further, the method implementation may include additional steps and/or omit performing illustrated steps. The scope of the present disclosure is not limited in this regard.

As used herein, the term "include" and variations thereof are open inclusion, that is, "including, but not limited to". The term "based on" means "based at least in part on." The term "one embodiment" means "at least one embodiment". The term "another embodiment" means "at least one additional embodiment"; The term "some embodiments" means "at least some embodiments". Relevant definitions for other terms will be given in the description below.

Note that the concepts of "first", "second", and the like mentioned in the present disclosure are used only to distinguish different devices, modules, or units, and are not used to limit the order or interdependence of functions performed by these devices, modules, or units. The modifications in the present disclosure such as "a", "a plurality" are illustrative rather than limiting, and those skilled in the art should understand that it should be understood as "one or more" unless the context clearly dictates otherwise.

Before the technical solutions are introduced, exemplary descriptions are first made to application scenarios. The technical solutions of the present disclosure may be applied to any scenario where three-dimensional feature data of an object needs to be acquired. For example, when three-dimensional data needs to be acquired in a live streaming scenario or a graphic design scenario, the technical solutions may be adopted.

Embodiment I

Figure 1:
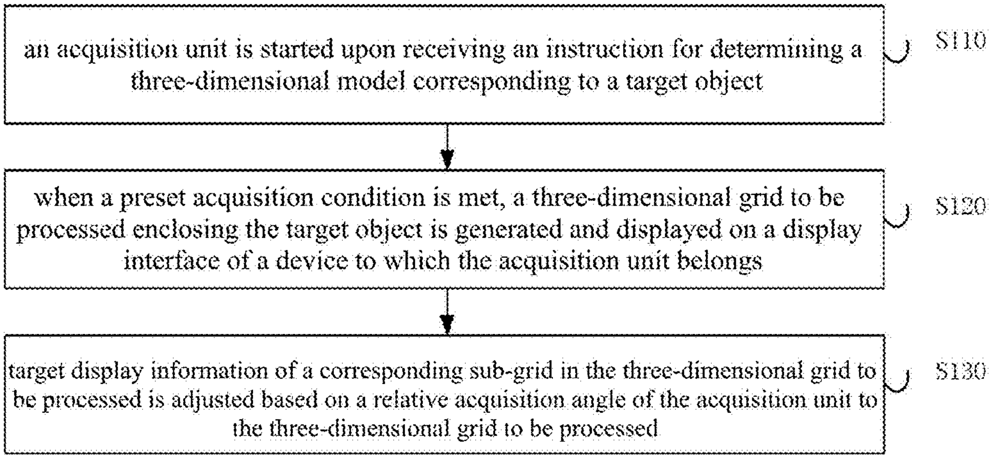
FIG. 1 is a flowchart of a data processing method provided by Embodiment I of the present disclosure.

FIG. 1 is a flowchart of a data processing method provided by Embodiment I of the present disclosure. This embodiment of the present disclosure is applicable to a scenario of acquiring three-dimensional data corresponding to a target object. The data processing method may be performed by a data processing apparatus that may be implemented in the form of software and/or hardware or implemented by an electronic device. The electronic device may be a mobile terminal, a personal computer (PC), a server, or the like.

As shown in FIG. 1, the data processing method of this embodiment includes the following steps.

At S110, an acquisition apparatus is started upon receiving an instruction for determining a three-dimensional model corresponding to a target object.

A plurality of applicable scenarios have been described simply and will not be described here redundantly. The apparatus for performing the data processing method provided by the embodiment of the present disclosure may be integrated into application software supporting a data processing function, and the software may be installed into an electronic device which may be a mobile terminal, a PC, or the like. The application software may be a type of software for acquiring object features. The application software will not be described redundantly here one by one as long as they can realize feature acquisition. Corresponding applications may be developed based on the technical solutions that may realize the functions mentioned in the technical solutions.

The target object refers to any article of which a feature is to be acquired, such as a wearable article and a doll article. A current object on which acquisition needs to be performed is taken as the target object. In practical use, the number of objects into shot may be one or more. If there is one object, the object may be taken as the target object. If there are a plurality of objects, the target object may be determined dynamically based on distance information of a camera to each object. For example, the object having a shortest distance may be taken as the target object. That is to say, a preset program may be deployed in advance within a terminal to determine the object closest to an image pickup apparatus as the target object based on the preset program. All the objects may be taken as the target objects. The target object may also be determined based on relative distance information between a plurality of objects into shot. For example, if the camera is close to an object, the object is the target object. There may be many objects within a circle of 1 cm in a neighborhood range of the object, and these objects located within the circle may be taken as the target objects. Alternatively, the object having the shortest distance to the camera is taken as the target object. The target object is inseparable from other objects, e.g., stacked, and therefore, the inseparable objects may be taken as the target object. The acquisition apparatus may be an image pickup apparatus having a shooting function. In practical use, the acquisition apparatus may be an image pickup apparatus to which an application software deployment terminal belongs, or an image pickup apparatus in communication with the deployment terminal. If deployed on a mobile terminal, the acquisition apparatus may be a built-in camera of the mobile terminal.

In practical use, when a user triggers a key on a display screen, it may be considered that the system receives the instruction for determining the three-dimensional model corresponding to the target object. At this time, the acquisition apparatus may be started to perform acquisition on the target object.

At S120, when a preset acquisition condition is met, a three-dimensional grid to be processed enclosing the target object is generated and displayed on a display interface of a device to which the acquisition apparatus belongs.

Figure 2:
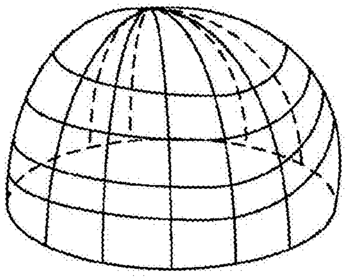
FIG. 2 is a schematic diagram of a three-dimensional grid to be processed provided by Embodiment I of the present disclosure.

The preset acquisition condition includes at least one of: the target object being present in a field of view of the acquisition apparatus; an acquisition control being triggered; and a display duration of the target object in the field of view reaching a preset duration threshold. The field of view refers to a region that the acquisition apparatus can shoot at a position, or a range that can be viewed. The acquisition control may be a key that can be displayed on the display interface of application software. The triggering of the key characterizes that acquisition needs to be performed on the target object and the three-dimensional grid enclosing the target object is generated. For example, if the user triggers the acquisition control, acquisition may be automatically triggered for the target object. The device to which the acquisition apparatus belongs may be a terminal device that the acquisition apparatus binds to, or may be a terminal device in remote communication with the acquisition apparatus. The three-dimensional grid to be processed may be a three-dimensional grid enclosing the target object, and is used to guide the user to acquire the data of the target object. The three-dimensional grid is a hemispherical transparent enclosure grid, as shown in FIG. 2. The three-dimensional grid to be processed includes a plurality of sub-grids. For example, the sub-grids may be obtained by dividing as per longitudes and latitudes, or may be obtained by dividing as per a preset grid area. In this embodiment, the benefit of determining the three-dimensional grid to be processed is that whether the data of the target object has been acquired may be determined based on display information of each sub-grid in the three-dimensional grid to be processed, thereby achieving the effect of acquisition progress visualization.

Figure 3:
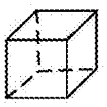
FIG. 3 is a schematic diagram of a target object provided by Embodiment I of the present disclosure.
Figure 4:
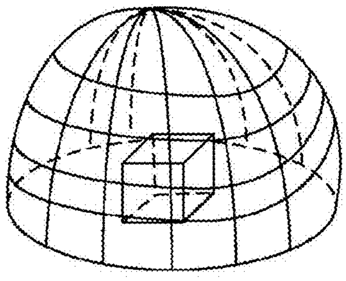
FIG. 4 is a schematic diagram of displaying a three-dimensional grid to be processed on a target object provided by Embodiment I of the present disclosure.

In this technical solution, there may be conditions for triggering the generation of the three-dimensional grid to be processed enclosing the target object. These conditions may be as follows: upon detecting that the target object is present in the field of view of the image pickup apparatus, it may be considered that the generation of the three-dimensional grid enclosing the target object is triggered. Alternatively, when the user triggers the acquisition control on the display screen, it is considered that the generation of the three-dimensional grid is triggered. Alternatively, upon detecting that the display duration of the target object in the field of view of the image pickup apparatus reaches the preset duration threshold, it is considered that the generation of the three-dimensional grid is triggered. For example, if the acquisition control has not been triggered after the user starts the acquisition apparatus, the acquisition of data may be started by default when a duration of the acquisition apparatus facing the target object reaches a preset duration, and the corresponding three-dimensional grid is generated. The convenience of data acquisition is improved. Correspondingly, the schematic diagram of the three-dimensional grid to be processed enclosing the target object (FIG. 3) may be shown in FIG. 2, and the three-dimensional grid to be processed enclosing the target object may be displayed on the display interface of the device to which the acquisition apparatus belongs, and the schematic diagram of display may be shown in FIG. 4.

In order to achieve the effect of acquisition progress visualization in the acquisition process, original display information of the three-dimensional grid to be processed may be set to semitransparent white. The original display information may also be an effect map allowing the target object to be seen. If the original display information is the effect map, an optical wave frequency band corresponding to the map cannot be acquired for the acquisition apparatus.

Upon detecting that at least one preset acquisition condition is met, the three-dimensional grid to be processed enclosing the target object may be generated on the display interface of the device to which the acquisition apparatus belongs. At this time, the benefits of enclosing the target object are as follows: the visual angle at which the image data of the target object is currently acquired may be determined; meanwhile, whether the complete data of the target object has been acquired may also be determined based on the three-dimensional grid to be processed.

At S130, target display information of a corresponding sub-grid in the three-dimensional grid to be processed is adjusted based on a relative acquisition angle of the acquisition apparatus to the three-dimensional grid to be processed.

In an actual acquisition process, the position of a mobile terminal may be variable, and correspondingly, the relative acquisition angle of the acquisition apparatus to the target object may also be variable. For example, a world coordinate system may be established with the center point of the target object as a center. When a camera rotates, the coordinates of the acquisition apparatus may change, and the relative acquisition angle to the target object may also change. A sub-grid in the three-dimensional grid to be processed relative to the current acquisition angle may be determined, and the display information of the sub-grid may be adjusted as the target display information. On this basis, the angle at which the view is acquired may be determined.

In this embodiment, the target display information may be color information or pattern information. The color information or the pattern information is not defined here. The target display information is distinct from the original display information of the three-dimensional grid to be processed. For example, the original display information is semitransparent white, and the target display information may be purple. Alternatively, according to an actual requirement, an image acquired at the current angle may be taken as the target display information. That is, the image shot at this angle is attached to the corresponding sub-grid.

Figure 5:
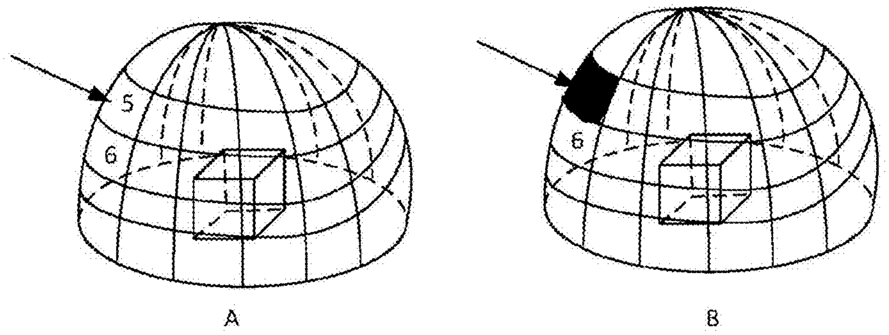
FIG. 5 is a schematic diagram of adjusting display information of a corresponding sub-grid in a three-dimensional grid to be processed to target display information provided by Embodiment I of the present disclosure.

Exemplarily, with reference to FIG. 5, it is assumed that the relative acquisition angle of the acquisition apparatus to the three-dimensional grid to be processed is 30 degrees which corresponds to No. 5 sub-grid, and upon the completion of acquisition, the color of the display information of the No. 5 sub-grid may be changed to purple (FIG. 5B) from original semitransparent white (FIG. 5A).

According to the technical solution of this embodiment of the present disclosure, the acquisition apparatus is started upon receiving the instruction for determining the three-dimensional model corresponding to the target object; when the preset acquisition condition is met, the three-dimensional grid to be processed enclosing the target object is generated and displayed on the display interface of the device to which the acquisition apparatus belongs; and the target display information of the corresponding sub-grid in the three-dimensional grid to be processed is adjusted based on the relative acquisition angle of the acquisition apparatus to the three-dimensional grid to be processed. It can be determined whether acquisition has been performed on the target object at the relative acquisition angle by determining whether the corresponding sub-grid in the three-dimensional grid to be processed has been adjusted as the target display information during acquisition on the target object. Not only can the problems of repeated acquisition and missed acquisition of data be avoided, but also the technical effect of improving the comprehensiveness, convenience and accuracy of data acquisition can be achieved.

Embodiment II

Figure 6:
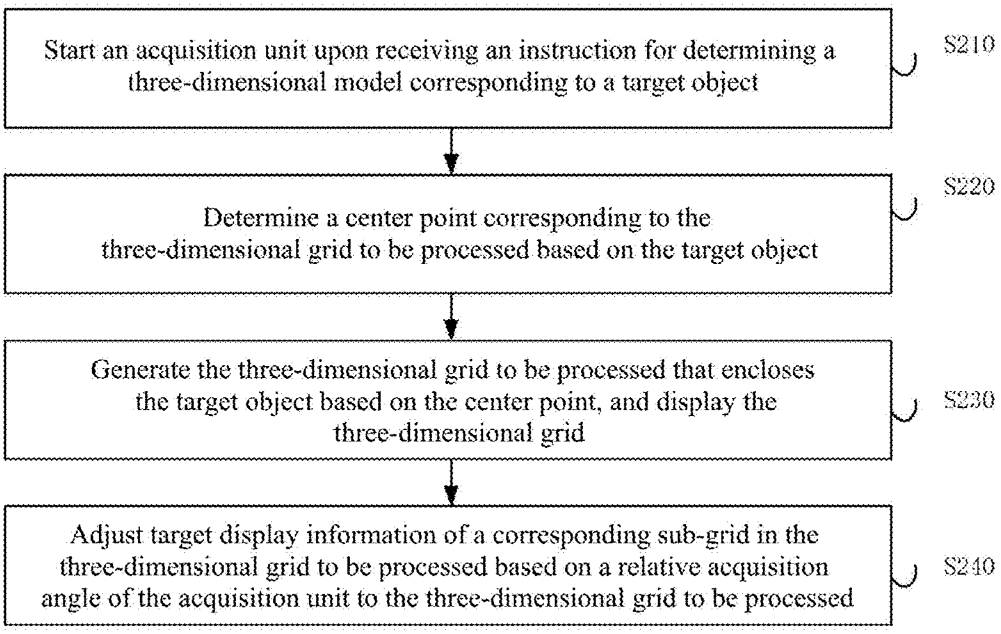
FIG. 6 is a flowchart of a data processing method provided by Embodiment II of the present disclosure.

FIG. 6 is a flowchart of a data processing method provided by Embodiment II of the present disclosure. S120 is described below on the basis of the foregoing embodiment. Technical terms the same as or similar to those in the above embodiment will not be repeatedly described here.

As shown in FIG. 6, the method includes the following steps.

At S210, an acquisition apparatus is started upon receiving an instruction for determining a three-dimensional model corresponding to a target object.

At S220, a center point corresponding to the three-dimensional grid to be processed is determined based on the target object.

In this embodiment, the three-dimensional grid to be processed may be hemispherical, or may be cubic or cuboid. The center point of the three-dimensional grid to be processed is an intersection point of a ray from the image pickup apparatus and a plane B in which the target object is placed. Correspondingly, in order to cause the generated three-dimensional grid to be processed to accurately enclose the target object, a radius may be determined based on a value of a distance between the center point of intersection of the ray from the image pickup apparatus and the plane B and an edge point of the target object. The hemispherical grid enclosing the target object is determined based on the center point and the radius. The center of the target object may also be taken as the center point. In order to improve the convenience of operation, a position of the display screen may be specified as the center point by the user. For example, a point corresponding to a triggering position may be taken as the center point based on a triggering operation of the user for the display screen.

The determining the center point corresponding to the three-dimensional grid to be processed based on the target object includes: determining the center point based on a visual angle of acquisition apparatus and a plane in which the target object resides; or determining the center point of the three-dimensional grid to be processed based on a triggering operation on the display interface.

The triggering operation may include, but is not limited to, operations such as tapping, touching, sliding, zooming in with two fingers, and zooming out with two fingers.

In this embodiment, an intersection position of acquisition light emitted by the acquisition apparatus and the plane in which the target object resides may be detected using a localization technique, and the intersection position is taken as the center point. For example, an intersection point of a camera ray and a plane in which the target object is placed is calculated using the simultaneous localization and mapping (SLAM) technique as the center point. The center point of the three-dimensional grid to be processed may also be determined based on the triggering operation of the user on the display interface. For example, when triggering the target object is detected, the position of triggering may be taken as the center point.

At S230, the three-dimensional grid to be processed that encloses the target object is generated based on the center point and is displayed.

In order to make the three-dimensional grid to be processed match the target object, the display size of the three-dimensional grid to be processed may be adjusted. If the three-dimensional grid to be processed is quasi-hemispherical, the display size may be characterized based on the radius. If the three-dimensional grid to be processed is cubic, the display size may be characterized by a side length. In this embodiment, the display size may be determined based on a display proportion of the target object in the display interface. The display proportion of the target object relative to the display interface is a first proportion. The first proportion may range from 20% to 50%, and the radius may be a first length. If the first proportion ranges from 50% to 80%, the radius may be a second length. The first length is distinct from the second length. The three-dimensional grid to be processed enclosing the target object may be drawn based on the display size described above.

In this embodiment, the determining the three-dimensional grid to be processed based on the display size may include: determining a radius length of the three-dimensional grid to be processed based on a display size of the target object in an image showing region to determine and display the three-dimensional grid to be processed based on the radius length and the center point.

Firstly, the description is made by taking the three-dimensional grid to be processed being a hemispherical grid as an example. When the target object is displayed in the display interface, a percentage thereof in a display region may be calculated. For example, when the display proportion is detected to be 80%, it may indicate that the size of the target object relative to the display interface is large, and at this time, the radius of the three-dimensional grid to be processed is large accordingly. If the display proportion is 20%, it indicates that the size of the target object relative to the display interface is small, and at this time, the radius of the three-dimensional grid to be processed is small accordingly. The three-dimensional grid to be processed may be drawn in this way.

In practical use, the radius length may be preset or determined dynamically. If the radius length is preset, there may be a case where the drawn three-dimensional grid to be processed does not match the target object. In this case, the radius length may be determined in the following way.

The three-dimensional grid to be processed is a hemispherical grid; and the generating and displaying the three-dimensional grid to be processed enclosing the target object based on the center point include: drawing a hemispherical grid corresponding to the target object as a grid to be used based on a preset radius length and the center point; and determining and displaying the three-dimensional grid to be processed based on an adjustment operation for the grid to be used.

In this embodiment, the adjustment operation may be an operation of zooming in by dragging with two fingers or an operation of zooming out by dragging with two fingers. One or more radius lengths may be preset. For example, if a plurality of radius lengths are set, corresponding suitable radius lengths may be configured in advance based on different display proportions of the target object on the display interface, and a mapping relationship between each display proportion and the corresponding radius length is established. For example, if the display proportion is 80%, the suitable radius length is 30 cm. If the display proportion is 20%, the suitable radius length is 10 cm. When the display proportion of the target object relative to the display interface is detected, the suitable radius length may be acquired based on the mapping relationship, and the corresponding hemispherical grid is drawn based on the radius length as the grid to be used. If one radius length is set, the radius length may be directly taken as the radius length for drawing the hemispherical grid. At this time, the drawn hemispherical grid may not enclose the target object, and the size of the hemispherical grid may be adjusted by the adjustment operation such as zooming in with two fingers or zooming out with two fingers to obtain the final three-dimensional grid to be processed.

In an embodiment, identification information of each sub-grid in the three-dimensional grid to be processed is determined, and a material parameter of each sub-grid is determined.

The identification information may be a grid serial number. The material parameter may be a semitransparent material.

When the three-dimensional grid to be processed is drawn, a corresponding grid serial number may be set for each sub-grid in the three-dimensional grid to be processed. When acquisition on a sub-grid is completed subsequently, the corresponding grid serial number may be sent to a client, thereby informing the client of the acquisition of the target object. Meanwhile, the material parameter of the sub-grid is set to semitransparent.

On the basis of the above solutions, in order to improve the ornamental property of the three-dimensional grid to be processed, a map may be set for each sub-grid in the three-dimensional grid to be processed. The map may be set according to an actual requirement. A plurality of map templates may be preset for selection by the user according to an actual requirement. For example, an effect map may be set for a sub-grid, e.g., a star sticker or an effect map matching a solar term, such as snowflakes in winter, Spring Festival flying dragon, and raindrops in summer. A grid edge line may also be added to a sub-grid such that the edge line of the sub-grid is clear, thereby improving the appeal to the user. If a map is set for each sub-grid, the target display information may be display information after the map is adjusted in color, transparency and depth.

At S240, target display information of a corresponding sub-grid in the three-dimensional grid to be processed is adjusted based on a relative acquisition angle of the acquisition apparatus to the three-dimensional grid to be processed.

According to the technical solution of this embodiment of the present disclosure, the center point is determined based on the intersection point of the acquisition light of the acquisition apparatus and the plane in which the target object resides, or based on the triggering operation on the display interface, such that the three-dimensional grid to be processed enclosing the target object is drawn and displayed based on the center point and the radius length. When data is acquired based on this grid, the data acquisition comprehensiveness can be improved, and missed acquisition of data can be avoided.

Embodiment III

Figure 7:
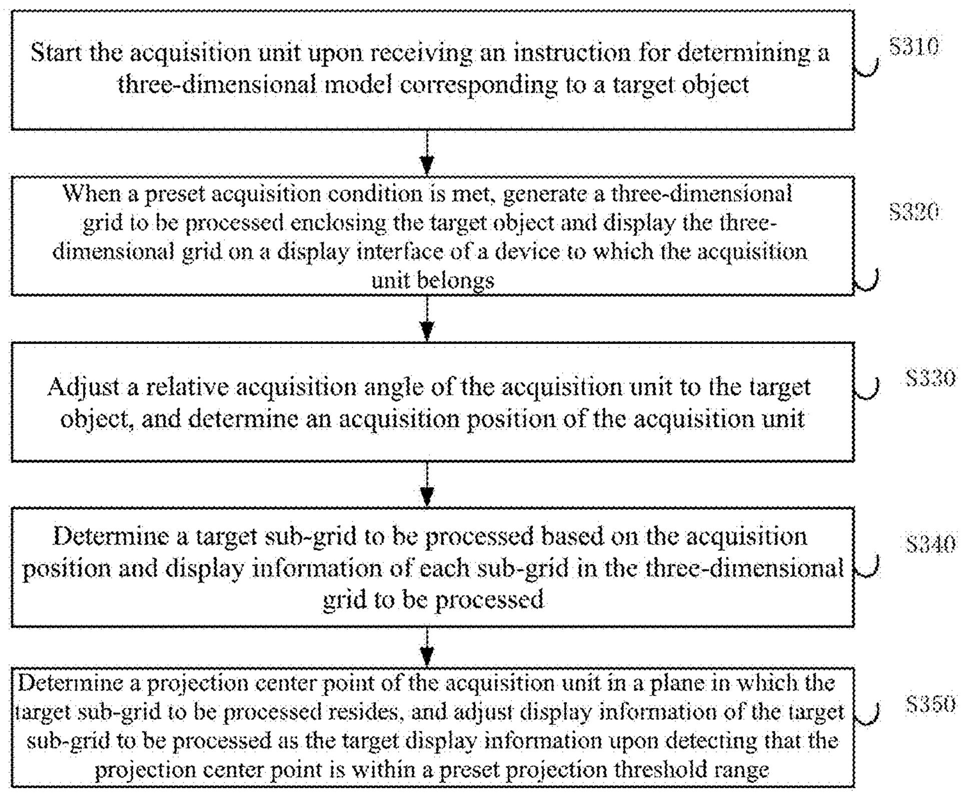
FIG. 7 is a flowchart of a data processing method provided by Embodiment III of the present disclosure.

FIG. 7 is a flowchart of a data processing method provided by Embodiment III of the present disclosure. S130 is described below on the basis of the foregoing embodiment. Technical terms the same as or similar to those in the above embodiment will not be repeatedly described here.

As shown in FIG. 7, the data processing method includes the following steps.

At S310, an acquisition apparatus is started upon receiving an instruction for determining a three-dimensional model corresponding to a target object.

At S320, when a preset acquisition condition is met, a three-dimensional grid to be processed enclosing the target object is generated and displayed on a display interface of a device to which the acquisition apparatus belongs.

At S330, a relative acquisition angle of the acquisition apparatus to the target object is adjusted, and an acquisition position of the acquisition apparatus is determined.

In this embodiment, this technical solution may be deployed in a terminal device. Correspondingly, acquisition is performed on the target object by the acquisition apparatus in the terminal device. In order to improve the data acquisition comprehensiveness, position information of the acquisition apparatus in space may be adjusted to perform acquisition on the target object based on the acquisition apparatus.

At S340, a target sub-grid to be processed is determined based on the acquisition position and display information of each sub-grid in the three-dimensional grid to be processed.

In practical use, it is assumed that the acquisition apparatus acquires object data at a visual angle. At this time, this visual angle corresponds to one sub-grid in the three-dimensional grid to be processed, and the sub-grid may be taken as the target sub-grid to be processed.

In the acquisition process, if the display information of a sub-grid is the original display information, it indicates that no acquisition is performed at the acquisition angle corresponding to the sub-grid. If comprehensive data needs to be obtained, data needs to be acquired at this angle.

The target sub-grid to be processed is determined based on the acquisition position and the display information of each sub-grid in the three-dimensional grid to be processed. In order to improve the convenience of acquisition, the display information of the sub-grid having the shortest distance may be determined based on a distance between the acquisition apparatus and each sub-grid. For example, whether the display information of the sub-grid having the shortest distance has been adjusted is determined. If the display information has been adjusted, it indicates that data has been acquired at this acquisition angle, and corresponding prompt information may be fed back. If the display information has not been adjusted, it indicates that data has not been acquired at this acquisition angle, and at this time, data may be acquired at this angle. The acquisition efficiency is improved.

The determining the target sub-grid to be processed based on the acquisition position and display information of each sub-grid in the three-dimensional grid to be processed includes: determining a sub-grid to be determined having a minimum distance from the acquisition position in the three-dimensional grid to be processed; and determining the sub-grid to be determined as the target sub-grid to be processed if display information of the sub-grid to be determined is not the target display information.

The sub-grid having the minimum distance from the acquisition apparatus may be determined and taken as the sub-grid to be determined. If the display information of the sub-grid to be processed is the target display information, it indicates that data has been acquired at this acquisition angle, and the acquired information may be fed back to the terminal device to prompt the user. If the display information of the sub-grid to be determined is not the target display information, acquisition may be performed on the target object at this angle. At this time, the sub-grid to be determined may be taken as the target sub-grid to be processed. In this way, the problem of repeated data acquisition is avoided.

At S350, a projection center point of the acquisition apparatus in a plane in which the target sub-grid to be processed resides is determined, and display information of the target sub-grid to be processed is adjusted as the target display information upon detecting that the projection center point is within a preset projection threshold range.

The preset projection threshold range is determined based on a grid center point of a corresponding sub-grid to be processed and distance information between the acquisition unit and the grid center point.

In this embodiment, when the acquisition unit emits acquisition light to perform acquisition on the target object, the projection center point of the acquisition light in the plane in which the target sub-grid to be processed resides may be calculated, and then whether the projection center point is within the preset projection threshold range. If the projection center point is within the preset projection threshold range, the display information of the target sub-grid to be processed is adjusted as the target display information. For example, in practical use, the intersection point of the plane in which the sub-grid having the shortest distance from the acquisition unit resides, and the ray in the projection direction of the acquisition unit may be calculated; whether the intersection point falls within the projection threshold range of the grid center point is determined; and if the intersection point falls within the projection threshold range of the grid center point, the color of the grid is adjusted. At this time, the serial number of the sub-grid may be transmitted to the client through a message. If the intersection point does not fall within the projection threshold range of the grid center point, the relative acquisition angle is adjusted until the target sub-grid to be processed is found, and the color of the grid is adjusted.

If the projection center point falls within the preset projection threshold range, data acquisition may be performed on the target object. At this time, the target display information of the target sub-grid to be processed may also be changed.

The adjusting the display information of the target sub-grid to be processed as the target display information upon detecting that the projection center point is within the preset projection threshold range includes: determining that acquisition on the target object has been completed at the relative acquisition angle if the projection center point is within the preset projection threshold range; and adjusting the display information of the target sub-grid to be processed as the target display information.

In this embodiment, if the projection center point corresponding to the acquisition light is within the preset projection threshold range, it indicates that data acquisition may be performed on the target object. Upon the completion of acquisition, the display information of the target sub-grid to be processed may be adjusted as the target display information.

According to the technical solution of this embodiment of the present disclosure, the relative acquisition angle of the acquisition unit to the target object is adjusted, and the acquisition position of the acquisition unit is determined. The target sub-grid to be processed is then determined based on the acquisition position and the display information of each sub-grid in the three-dimensional grid to be processed. Whether the projection center point of the acquisition unit in the plane in which the target sub-grid to be processed resides is within the preset projection threshold range is then determined. If the projection center point of the acquisition unit in the plane in which the target sub-grid to be processed resides is within the preset projection threshold range, the display information of the target sub-grid to be processed is adjusted. Thus, the display information of the sub-grid is adjusted accurately, and the technical effect of improving the data acquisition accuracy is achieved.

Embodiment IV

Figure 8:
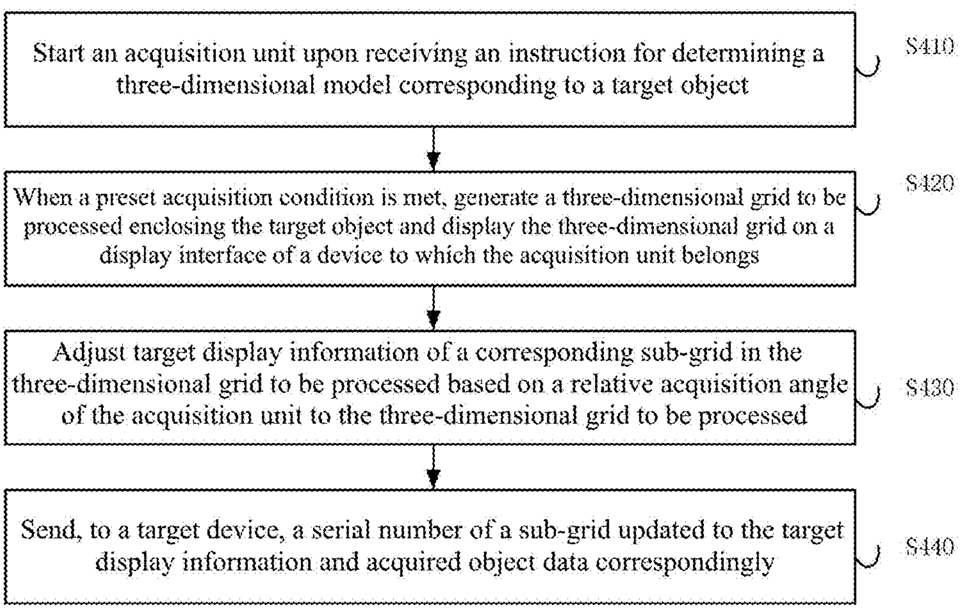
FIG. 8 is a flowchart of a data processing method provided by Embodiment IV of the present disclosure.

FIG. 8 is a flowchart of a data processing method provided by Embodiment IV of the present disclosure. On the basis of the foregoing embodiments, after the target display information of the corresponding sub-grid in the three-dimensional grid to be processed is adjusted, a serial number of a sub-grid updated to the target display information and acquired object data may be correspondingly sent to a target device such that whether acquisition on the target object has been completed is determined based on the obtained serial number of the sub-grid. Thus, the three-dimensional model of the target object can be drawn based on the acquired object data. This implementation may be as shown in the technical solutions of this embodiment. Technical terms the same as or similar to those in the above embodiment will not be repeatedly described here.

As shown in FIG. 8, the data processing method includes the following steps.

At S410, an acquisition unit is started upon receiving an instruction for determining a three-dimensional model corresponding to a target object.

At S420, when a preset acquisition condition is met, a three-dimensional grid to be processed enclosing the target object is generated and displayed on a display interface of a device to which the acquisition unit belongs.

At S430, target display information of a corresponding sub-grid in the three-dimensional grid to be processed is adjusted based on a relative acquisition angle between the acquisition unit and the three-dimensional grid to be processed.

At S440, a serial number of a sub-grid updated to the target display information and acquired object data are correspondingly sent to a target device.

The target device may be a device used for performing acquisition on the target object.

In this embodiment, the serial number of the sub-grid updated to the target display information and the object data corresponding to the sub-grid may be sent as data to the target device such that the target device determines the acquisition angle at which the current data is acquired as a target object view.

When the target device receives the serial number of a sub-grid, data acquisition may also be determined on a count of serial numbers of sub-grids to dynamically adjust the data acquisition progress information.

The acquisition progress information of the target object ion the display interface is adjusted upon detecting that the display information of the corresponding sub-grid is adjusted as the target display information.

For the acquisition progress of the target object, an acquisition progress bar corresponding to the target object may be preset, and an acquisition ring may be adopted and displayed on the display screen. The acquisition progress bar and the acquisition ring both match the acquisition control. The user may determine the acquisition progress based on a percentage on the acquisition progress information. The percentage is determined based on the total number of grids and the number of grids that have been adjusted as the target display information. Upon receiving a data pair or detecting that the display information of the sub-grid has been updated to the target display information, the acquisition progress information for the target object on the display interface is adjusted. For example, assuming that there are 100 sub-grids, if 10 sub-grids have been adjusted as the target display information, the acquisition progress percentage is 10%.

When the acquisition progress information is 100%, it indicates that acquisition on the target object has been completed. At this time, a corresponding special prompt may be given, e.g., a prompt such as “didi” or “dada” sound and music.

It is determined that acquisition on the target object is completed and three-dimensional data of the target object is obtained upon detecting that the display information of each sub-grid in the three-dimensional grid to be processed is the target display information.

In this embodiment, upon detecting that the display information of each sub-grid in the three-dimensional grid to be processed is the target display information, it is considered that acquisition on the target object has been completed, and acquired feature data may be taken as the three-dimensional data of the target object.

After the three-dimensional data is obtained, in order to enable the user to know images of the target object at different visual angles, the three-dimensional model corresponding to the target object may be constructed based on the three-dimensional data and displayed on the terminal device.

The three-dimensional model corresponding to the target object is constructed and displayed based on the three-dimensional data to determine the images of the target object at different visual angles based on the triggering operation for the three-dimensional model.

The three-dimensional data may be processed using a model reconstruction technique such that the three-dimensional model corresponding to the target object is constructed. The three-dimensional model may also be constructed using a plurality of pieces of computer software. For example, a project is firstly created using computer aided drafting (CAD) or revit software. After the determined three-dimensional data is imported to the software, corresponding configuration items in the software are set based on such information. After software parameters have been set, rendering and simulation operations may be performed on the target object, and then the three-dimensional model corresponding to the target object may be constructed. The three-dimensional model may be then shown on the display interface. A target display interface is the display interface of the corresponding terminal device when the three-dimensional model is uploaded. The images of the target object at different visual angles may be obtained by the triggering operation for the three-dimensional model. For example, the user taps on a position of the model, the image of the target object at the visual angle of this position may be obtained.

According to the technical solution of this embodiment of the present disclosure, the serial number of the sub-grid updated to the target display information and the acquired object data are correspondingly sent to the target terminal device. Meanwhile, upon detecting that the display information of each sub-grid in the three-dimensional grid to be processed is the target display information, it is determined that acquisition on the target object has been completed, thereby obtaining the three-dimensional data of the target object. The three-dimensional model corresponding to the target object is constructed and displayed. Thus, the images of the target object at different visual angles are determined based on the triggering operation of the three-dimensional model. The efficiency and accuracy of acquisition are improved while the output of the three-dimensional model is guaranteed.

Embodiment V

Figure 9:
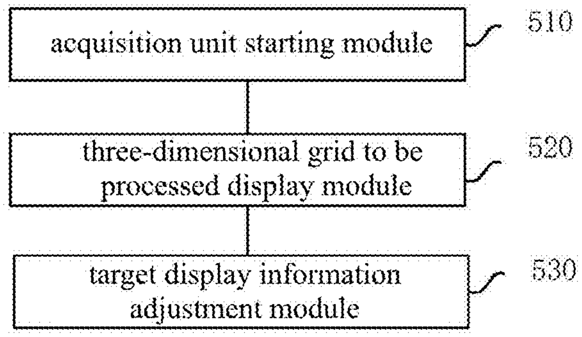
FIG. 9 is a structural block diagram of a data processing apparatus provided by Embodiment V of the present disclosure.

FIG. 9 is a structural block diagram of a data processing apparatus provided by Embodiment V of the present disclosure. The data processing apparatus may perform the data processing method provided in any embodiment of the present disclosure and has corresponding functional modules for performing the method and corresponding effects. As shown in FIG. 9, the data processing apparatus includes an acquisition unit starting module 510, a three-dimensional grid to be processed display module 520, and a target display information adjustment module 530.

The acquisition unit starting module 510 is configured to start an acquisition unit upon receiving an instruction for determining a three-dimensional model corresponding to a target object; the three-dimensional grid to be processed display module 520 is configured to, when a preset acquisition condition is met, generate a three-dimensional grid to be processed enclosing the target object and display it on a display interface of a device to which the acquisition unit belongs; and the target display information adjustment module 530 is configured to adjust target display information of a corresponding sub-grid in the three-dimensional grid to be processed based on a relative acquisition angle between the acquisition unit and the three-dimensional grid to be processed.

On the basis of the above technical solutions, the preset acquisition condition includes at least one of: the target object being present in a field of view of the acquisition unit; an acquisition control being triggered; and a display duration of the target object in the field of view reaching a preset duration threshold.

On the basis of the above technical solutions, the three-dimensional grid to be processed display module 520 includes a center point determination unit and a to-be-processed three-dimensional grid display unit.

The center point determination unit is configured to determine a center point corresponding to the three-dimensional grid to be processed based on the target object; and the to-be-processed three-dimensional grid display unit is configured to generate and display the three-dimensional grid to be processed enclosing the target object based on the center point.

On the basis of the above technical solutions, the center point determination unit includes a center point determination sub-unit.

The center point determination sub-unit is configured to: determine the center point based on a visual angle of the acquisition unit and a plane in which the target object resides; or determine the center point of the three-dimensional grid to be processed based on a triggering operation on the display interface.

On the basis of the above technical solutions, the three-dimensional grid to be processed is a hemispherical grid, and the to-be-processed three-dimensional grid display unit further includes a first radius length determination sub-unit.

The first radius length determination sub-unit is configured to determine a radius length of the three-dimensional grid to be processed based on a display size of the target object in an image showing region to determine and display the three-dimensional grid to be processed based on the radius length and the center point.

On the basis of the above technical solutions, the three-dimensional grid to be processed is a hemispherical grid, and the to-be-processed three-dimensional grid display unit further includes a second radius length determination sub-unit and a to-be-processed three-dimensional grid display sub-unit.

The second radius length determination sub-unit is configured to draw a hemispherical grid corresponding to the target object as a grid to be used based on a preset radius length and the center point; and the to-be-processed three-dimensional grid display sub-unit is configured to determine and display the three-dimensional grid to be processed based on an adjustment operation for the grid to be used.

On the basis of the above technical solutions, the data processing apparatus further includes a sub-grid parameter determination sub-unit.

The sub-grid parameter determination sub-unit is configured to determine identification information of each sub-grid in the three-dimensional grid to be processed, and determine a material parameter of each sub-grid.

On the basis of the above technical solutions, sub-grid parameter determination sub-unit includes a map setting junior unit.

The map setting junior unit is configured to set a map for each sub-grid in the three-dimensional grid to be processed.

On the basis of the above technical solutions, the target display information adjustment module 520 includes an acquisition position determination unit, a target to-be-processed sub-grid determination unit, and a target display information adjustment unit.

The acquisition position determination unit is configured to adjust a relative acquisition angle of the acquisition unit to the target object, and determine an acquisition position of the acquisition unit; the target to-be-processed sub-grid determination unit is configured to determine a target sub-grid to be processed based on the acquisition position and display information of each sub-grid in the three-dimensional grid to be processed; and the target display information adjustment unit is configured to determine a projection center point of the acquisition unit in a plane in which the target sub-grid to be processed resides, and adjust display information of the target sub-grid to be processed to the target display information upon detecting that the projection center point is within a preset projection threshold range, where the preset projection threshold range is determined based on a grid center point of a corresponding sub-grid to be processed.

On the basis of the above technical solutions, the target to-be-processed sub-grid determination unit includes a to-be-determined sub-grid determination sub-unit and a target to-be-processed sub-grid determination sub-unit.

The to-be-determined sub-grid determination sub-unit is configured to determine a sub-grid to be determined having a minimum distance from the acquisition position in the three-dimensional grid to be processed; and the target to-be-processed sub-grid determination sub-unit is configured to determine the sub-grid to be determined as the target sub-grid to be processed if display information of the sub-grid to be determined is not the target display information.

On the basis of the above technical solutions, the target display information adjustment unit includes an acquisition completion sub-unit and a target display information adjustment sub-unit.

The acquisition completion sub-unit is configured to determine that acquisition on the target object has been completed at the relative acquisition angle if the projection center point is within the preset projection threshold range; and the target display information adjustment sub-unit is configured to adjust the display information of the target sub-grid to be processed to the target display information.

On the basis of the above technical solutions, the target display information is distinct from original display information of the three-dimensional grid to be processed; and the target display information includes color information or pattern information.

On the basis of the above technical solutions, the data processing apparatus further includes a data sending module.

The data sending module is configured to correspondingly send a serial number of a sub-grid updated to the target display information and acquired object data to a target device.

On the basis of the above technical solutions, the data processing apparatus further includes an acquisition progress information adjustment module.

The acquisition progress information adjustment module is configured to adjust acquisition progress information of the target object on the display interface upon detecting that the display information of the corresponding sub-grid is adjusted as the target display information.

On the basis of the above technical solutions, the data processing apparatus further includes a three-dimensional data obtaining module.

The three-dimensional data obtaining module is configured to determine that acquisition on the target object is completed and three-dimensional data of the target object is obtained upon detecting that the display information of each sub-grid in the three-dimensional grid to be processed is the target display information.

On the basis of the above technical solutions, the three-dimensional data obtaining module includes a three-dimensional model construction unit.

The three-dimensional model construction unit is configured to construct and display a three-dimensional model corresponding to the target object based on the three-dimensional data to determine images of the target object at different visual angles based on a triggering operation for the three-dimensional model.

According to the technical solutions of this embodiment of the present disclosure, when acquisition is performed on the target object, the three-dimensional grid to be processed enclosing the target object is generated and displayed; and the target display information of the corresponding sub-grid in the three-dimensional grid to be processed is adjusted based on the relative acquisition angle between the acquisition unit and the three-dimensional grid to be processed. It can be determined whether acquisition has been performed on the target object at the relative acquisition angle by determining whether the corresponding sub-grid in the three-dimensional grid to be processed has been adjusted as the target display information during acquisition on the target object. Not only can the problems of repeated acquisition and missed acquisition of data be avoided, but also the technical effect of improving the comprehensiveness, convenience and accuracy of data acquisition can be achieved.

The data processing apparatus provided in the embodiment of the present disclosure may perform the data processing method provided in any embodiment of the present disclosure and has corresponding functional modules for performing the method and corresponding effects.

The plurality of units and modules included in the data processing apparatus are only divided according to functional logic, but are not limited to the above division, as long as corresponding functions can be implemented. In addition, specific names of the plurality of functional units are merely for the purpose of distinguishing from each other, but are not intended to limit the protection scope of the present disclosure.

Embodiment VI

Figure 10:
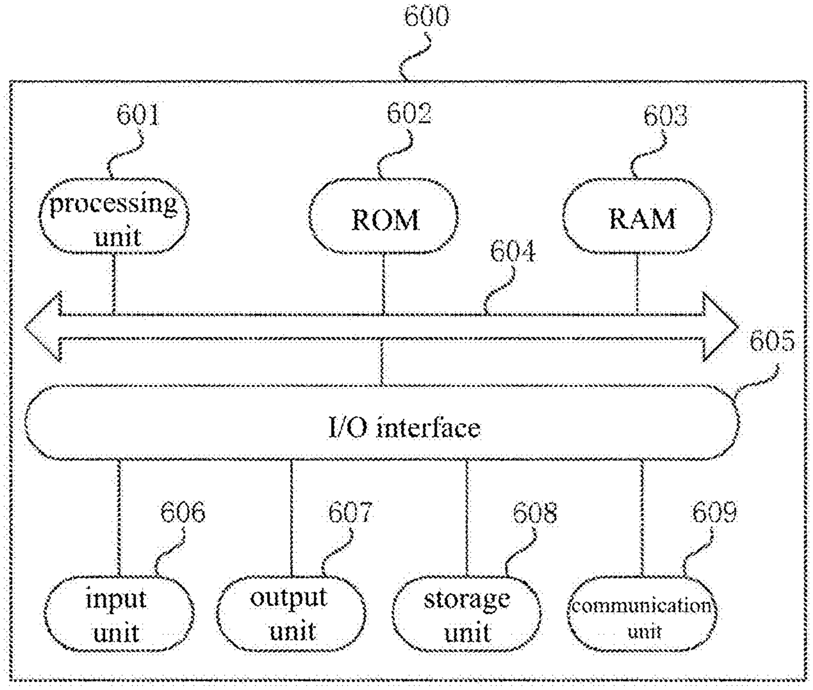
FIG. 10 is a structural schematic diagram an electronic device provided by Embodiment VI of the present disclosure.

FIG. 10 is a structural schematic diagram an electronic device provided by Embodiment VI of the present disclosure. With reference to FIG. 10, there is shown a structural schematic diagram of an electronic device (e.g., a terminal device or a server in FIG. 10) 600 adapted to implement the embodiments of the present disclosure. The terminal device in this embodiment of the present application may include, but is not be limited to, mobile terminals such as a mobile phone, a notebook computer, a digital broadcasting receiver, a personal digital assistant (PDA), a portable Android device (PAD), a portable media player (PMP), and a vehicle-mounted terminal (e.g., a vehicle-mounted navigation terminal), and fixed terminals such as a digital TV and a desktop computer. The electronic device 600 shown in FIG. 10 is merely an example, and should not impose any limitation to the functions and the range of use of the embodiments of the present disclosure.

As shown in FIG. 10, the electronic device 600 may include a processing unit (e.g., a central processing unit, or a graphics processing unit) 601, which can perform a plurality of suitable actions and processing according to a program stored on a read-only memory (ROM) 602 or a program loaded from a memory 608 into a random-access memory (RAM) 603. The RAM 603 further stores various programs and data required for operations of the electronic device 600. The processing unit 601, the ROM 602, and the RAM 603 are interconnected by means of a bus 604. An input/output (I/O) interface 605 is also connected to the bus 604.

Usually, the following units may be connected to the I/O interface 605: an input unit 606 including, for example, a touch screen, a touch pad, a keyboard, a mouse, a camera, a microphone, an accelerometer, and a gyroscope; an output unit 607 including, for example, a liquid crystal display (LCD), a loudspeaker, and a vibrator; a memory 608 including, for example, a magnetic tape and a hard disk; and a communication unit 609. The communication unit 609 may allow the electronic device 600 to be in wireless or wired communication with other devices to exchange data. While FIG. 10 illustrates the electronic device 600 having a plurality of units, it is to be understood that all the illustrated units are not necessarily implemented or included. More or less units may be implemented or included alternatively.

According to the embodiments of the present disclosure, the process described above with reference to the flowchart may be implemented as a computer software program. For example, an embodiment of the present disclosure includes a computer program product including a computer program carried by a non-transitory computer-readable medium. The computer program includes a program code for executing the method shown in the flowchart. In such embodiments, the computer program may be downloaded online through the communication unit 609 and installed, or installed from the memory 608, or installed from the ROM 602. When the computer program is executed by the processing unit 601, the functions defined in the method of the embodiments of the present disclosure are executed.

Names of messages or information exchanged between a plurality of units in embodiments of the present disclosure are only used for the purpose of description and not meant to limit the scope of these messages or information.

The electronic device provided in the present embodiment of the present disclosure and the data processing method provided in the foregoing embodiments belong to the same concept. For technical details not described in detail in the present embodiment, a reference may be made to the foregoing embodiments, and the present embodiment and the foregoing embodiments have the same effects.

Embodiment VII

Embodiment VII of the present disclosure provides a computer storage medium storing a computer program which, when executed by a processor, causes implementing the data processing method provided in the foregoing embodiments.

The computer-readable medium described above in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination of them. Examples of the computer-readable storage medium may include, but are not limited to, an electrical connection with one or more wires, a portable computer disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In the present disclosure, the computer-readable storage medium may be any tangible medium that contains or stores a program, and the program may be used by or in combination with an instruction execution system, apparatus, or device. In the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

In some implementations, a client and a server may communicate by means of any network protocol currently known or to be developed in future such as HyperText Transfer Protocol (HTTP), and may achieve communication and interconnection with digital data (e.g., a communication network) in any form or of any medium. Examples of the communication network include a local area network (LAN), a wide area network (WAN), an internet work (e.g., the Internet), a peer-to-peer network (e.g., ad hoc peer-to-peer network), and any network currently known or to be developed in future.

The above-mentioned computer-readable medium may be included in the electronic device described above, or may exist alone without being assembled with the electronic device.

The above-mentioned computer-readable medium may carry one or more programs which, when executed by the electronic device, cause the electronic device to:

start an acquisition unit upon receiving an instruction for determining a three-dimensional model corresponding to a target object; when a preset acquisition condition is met, generate a three-dimensional grid to be processed enclosing the target object and display it on a display interface of a device to which the acquisition unit belongs; and adjust target display information of a corresponding sub-grid in the three-dimensional grid to be processed based on a relative acquisition angle between the acquisition unit and the three-dimensional grid to be processed.

A computer program code for performing the operations in the present disclosure may be written in one or more programming languages or a combination thereof. The programming languages include but are not limited to object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may connect to a user computer over any type of network, including a local area network (LAN) or a wide area network (WAN), or may connect to an external computer (e.g., over the Internet by using an Internet service provider).

The flowcharts and block diagrams in the accompanying drawings illustrate system architectures, functions and operations that may be implemented by the system, method and computer program product according to a plurality of embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some alternative implementations, the functions marked in the blocks may alternatively occur in a different order from that marked in the drawings. For example, two successively shown blocks actually may be executed in parallel substantially, or may be executed in reverse order sometimes, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related units described in the embodiments of the present disclosure may be implemented by software, or may be implemented by hardware. The name of a unit does not impose a limitation on the unit itself in a case. For example, a first obtaining unit may also be described as "a unit for obtaining at least two Internet protocol addresses".

The functions described above in this specification may be at least partially performed by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include but be not limited to an electronic, magnetic, optical, electromagnetic, infrared, or semiconductor system, apparatus or device, or any appropriate combination thereof. Examples of the machine-readable storage medium may include an electrical connection based on one or more wires, a portable computer disk, a hard disk, a random access memory (RAM), a read-only memory (ROM), an erasable programmable ROM (an EPROM or a flash memory), an optical fiber, a portable compact disc read-only memory (CD-ROM) an optical storage device, a magnetic storage device, or any suitable combination thereof.

According to one or more embodiments of the present disclosure, [Example 1] provides a data processing method, including:

starting an acquisition unit upon receiving an instruction for determining a three-dimensional model corresponding to a target object;

when a preset acquisition condition is met, generating a three-dimensional grid to be processed enclosing the target object and displaying it on a display interface of a device to which the acquisition unit belongs; and adjusting target display information of a corresponding sub-grid in the three-dimensional grid to be processed based on a relative acquisition angle between the acquisition unit and the three-dimensional grid to be processed.

According to one or more embodiments of the present disclosure, [Example 2] provides a data processing method, including:

the preset acquisition condition including at least one of:

the target object being present in a field of view of the acquisition unit;

an acquisition control being triggered; and a display duration of the target object in the field of view reaching a preset duration threshold.

According to one or more embodiments of the present disclosure, [Example 3] provides a data processing method, further including:

determining a center point corresponding to the three-dimensional grid to be processed based on the target object; and generating and displaying the three-dimensional grid to be processed enclosing the target object based on the center point.

According to one or more embodiments of the present disclosure, [Example 4] provides a data processing method, further including:

determining the center point based on a visual angle of the acquisition unit and a plane in which the target object resides; or determining the center point of the three-dimensional grid to be processed based on a triggering operation on the display interface.

According to one or more embodiments of the present disclosure, [Example 5] provides a data processing method, further including:

the three-dimensional grid to be processed being a hemispherical grid, and determining a radius length of the three-dimensional grid to be processed based on a display size of the target object in an image showing region to determine and display the three-dimensional grid to be processed based on the radius length and the center point.

According to one or more embodiments of the present disclosure, [Example 6] provides a data processing method, further including:

the three-dimensional grid to be processed being a hemispherical grid, drawing a hemispherical grid corresponding to the target object as a grid to be used based on a preset radius length and the center point; and determining and displaying the three-dimensional grid to be processed based on an adjustment operation for the grid to be used.

According to one or more embodiments of the present disclosure, [Example 7] provides a data processing method, further including:

determining identification information of each sub-grid in the three-dimensional grid to be processed, and determining a material parameter of each sub-grid.

According to one or more embodiments of the present disclosure, [Example 8] provides a data processing method, further including:

setting a map for each sub-grid in the three-dimensional grid to be processed.

According to one or more embodiments of the present disclosure, [Example 9] provides a data processing method, further including:

adjusting a relative acquisition angle between the acquisition unit and the target object, and determining an acquisition position of the acquisition unit;

determining a target sub-grid to be processed based on the acquisition position and display information of each sub-grid in the three-dimensional grid to be processed; and determining a projection center point of the acquisition unit in a plane in which the target sub-grid to be processed resides, and adjusting display information of the target sub-grid to be processed to the target display information upon detecting that the projection center point is within a preset projection threshold range, where the preset projection threshold range is determined based on a grid center point of a corresponding sub-grid to be processed.

According to one or more embodiments of the present disclosure, [Example 10] provides a data processing method, further including:

determining a sub-grid to be determined having a minimum distance from the acquisition position in the three-dimensional grid to be processed; and determining the sub-grid to be determined as the target sub-grid to be processed if display information of the sub-grid to be determined is not the target display information.

According to one or more embodiments of the present disclosure, [Example 11] provides a data processing method, further including:

determining that acquisition on the target object has been completed at the relative acquisition angle if the projection center point is within the preset projection threshold range; and adjusting the display information of the target sub-grid to be processed as the target display information.

According to one or more embodiments of the present disclosure, [Example 12] provides a data processing method, further including:

the target display information being distinct from original display information of the three-dimensional grid to be processed; and the target display information including color information or pattern information.

According to one or more embodiments of the present disclosure, [Example 13] provides a data processing method, further including:

correspondingly sending a serial number of a sub-grid updated to the target display information and acquired object data to a target device.

According to one or more embodiments of the present disclosure, [Example 14] provides a data processing method, further including:

adjusting acquisition progress information of the target object on the display interface upon detecting that the display information of the corresponding sub-grid is adjusted as the target display information.

According to one or more embodiments of the present disclosure, [Example 15] provides a data processing method, further including:

determining that acquisition on the target object is completed and three-dimensional data of the target object is obtained upon detecting that the display information of each sub-grid in the three-dimensional grid to be processed is the target display information.

According to one or more embodiments of the present disclosure, [Example 16] provides a data processing method, further including:

constructing and displaying a three-dimensional model corresponding to the target object based on the three-dimensional data to determine images of the target object at different visual angles based on a triggering operation for the three-dimensional model.

According to one or more embodiments of the present disclosure, [Example 17] provides a data processing apparatus, including:

an acquisition unit starting module configured to start an acquisition unit upon receiving an instruction for determining a three-dimensional model corresponding to a target object;

a three-dimensional grid to be processed display module configured to, when a preset acquisition condition is met, generate a three-dimensional grid to be processed enclosing the target object and display it on a display interface of a device to which the acquisition unit belongs; and a target display information adjustment module configured to adjust target display information of a corresponding sub-grid in the three-dimensional grid to be processed based on a relative acquisition angle between the acquisition unit and the three-dimensional grid to be processed.

Further, while operations are depicted in a particular order, this should not be understood as requiring that these operations be performed in the particular order shown or in sequential order. In certain circumstances, multitasking and parallel processing may be advantageous. Likewise, while several specific implementation details are contained in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

The invention claimed is:

1. A data processing method, comprising:

starting an acquisition unit upon receiving an instruction for acquiring a three-dimensional model corresponding to a target object;

generating, in response to meeting a preset acquisition condition, a three-dimensional grid to be processed enclosing the target object, and displaying the three-dimensional grid to be processed on a display interface of a device to which the acquisition unit belongs;

adjusting target display information of a corresponding sub-grid in the three-dimensional grid to be processed based on a relative acquisition angle between the acquisition unit and the three-dimensional grid to be processed; and wherein after the adjusting target display information of a corresponding sub-grid in the three-dimensional grid to be processed, the data processing method further comprises:

correspondingly sending a serial number of a target sub-grid to be processed whose display information is updated as the target display information and acquired object data to a target device.

2. The data processing method according to claim 1, wherein the preset acquisition condition comprises at least one of:

the target object being present in a field of view of the acquisition unit;

an acquisition control being triggered; and a display duration of the target object in the field of view reaching a preset duration threshold.

3. The data processing method according to claim 1, wherein the generating, in response to meeting a preset acquisition condition, a three-dimensional grid to be processed enclosing the target object, and displaying the three-dimensional grid to be processed on a display interface of a device to which the acquisition unit belongs comprises:

determining a center point corresponding to the three-dimensional grid to be processed based on the target object; and generating and displaying the three-dimensional grid to be processed enclosing the target object based on the center point.

4. The data processing method according to claim 3, wherein the determining a center point corresponding to the three-dimensional grid to be processed based on the target object comprises:

determining the center point based on a visual angle of the acquisition unit and a plane in which the target object resides; or determining the center point of the three-dimensional grid to be processed based on a triggering operation on the display interface.

5. The data processing method according to claim 3, wherein the three-dimensional grid to be processed is a hemispherical grid; and the generating and displaying the three-dimensional grid to be processed enclosing the target object based on the center point comprise:

determining a radius length of the three-dimensional grid to be processed based on a display size of the target object in an image showing region to determine and display the three-dimensional grid to be processed based on the radius length and the center point.

6. The data processing method according to claim 3, wherein the three-dimensional grid to be processed is a hemispherical grid; and the generating and displaying the three-dimensional grid to be processed enclosing the target object based on the center point comprise:

drawing a hemispherical grid corresponding to the target object as a grid to be used based on a preset radius length and the center point; and determining and displaying the three-dimensional grid to be processed based on an adjustment operation for the grid to be used.

7. The data processing method according to claim 1, further comprising:

determining identification information of each sub-grid in the three-dimensional grid to be processed, and determining a material parameter of each sub-grid.

8. The data processing method according to claim 7, further comprising:

setting a map for each sub-grid in the three-dimensional grid to be processed.

9. The data processing method according to claim 1, wherein the adjusting target display information of a corresponding sub-grid in the three-dimensional grid to be processed based on a relative acquisition angle between the acquisition unit and the three-dimensional grid to be processed comprises:

adjusting a relative acquisition angle between the acquisition unit and the target object, and determining an acquisition position of the acquisition unit;

determining a target sub-grid to be processed based on the acquisition position and display information of each sub-grid in the three-dimensional grid to be processed; and determining a projection center point of the acquisition unit in a plane in which the target sub-grid to be processed resides, and adjusting display information of the target sub-grid to be processed to the target display information upon detecting that the projection center point is within a preset projection threshold range, wherein the preset projection threshold range is determined based on a grid center point of a corresponding sub-grid to be processed.

10. The data processing method according to claim 9, wherein the determining a target sub-grid to be processed based on the acquisition position and display information of each sub-grid in the three-dimensional grid to be processed comprises:

determining a sub-grid to be determined having a minimum distance from the acquisition position in the three-dimensional grid to be processed; and determining the sub-grid to be determined as the target sub-grid to be processed in response to display information of the sub-grid to be determined being not the target display information.

11. The data processing method according to claim 9, wherein the adjusting display information of the target sub-grid to be processed to the target display information upon detecting that the projection center point is within a preset projection threshold range comprises:

determining that acquisition on the target object has been completed at the relative acquisition angle in response to the projection center point being within the preset projection threshold range; and adjusting the display information of the target sub-grid to be processed as the target display information.

12. The data processing method according to claim 1, wherein the target display information is distinct from original display information of the three-dimensional grid to be processed; and the target display information comprises color information or pattern information.

13. The data processing method according to claim 1, further comprising:

adjusting acquisition progress information of the target object on the display interface upon detecting that the display information of the corresponding sub-grid is adjusted as the target display information.

14. The data processing method according to claim 1, further comprising:

determining that acquisition on the target object is completed and three-dimensional data of the target object is obtained upon detecting that the display information of each sub-grid in the three-dimensional grid to be processed is the target display information.

15. The data processing method according to claim 14, further comprising:

constructing and displaying a three-dimensional model corresponding to the target object based on the three-dimensional data, to determine images of the target object at different visual angles based on a triggering operation for the three-dimensional model.

16. A computer program product, comprising a computer program carried on a non-transitory computer-readable storage medium, wherein the computer program comprises program codes for performing the data processing method according to claim 1.

17. An electronic device, comprising:

at least one processor; and a memory configured to store at least one program, the at least one program, when executed by the at least one processor, causes the at least one processor to:

start an acquisition unit upon receiving an instruction for acquiring a three-dimensional model corresponding to a target object;

generate, in response to meeting a preset acquisition condition, a three-dimensional grid to be processed enclosing the target object, and display the three-dimensional grid to be processed on a display interface of a device to which the acquisition unit belongs;

adjust target display information of a corresponding sub-grid in the three-dimensional grid to be processed based on a relative acquisition angle between the acquisition unit and the three-dimensional grid to be processed; and wherein the at least one program further causes the at least one processor to:

correspondingly send a serial number of a target sub-grid to be processed whose display information is updated as the target display information and acquired object data to a target device.

18. The electronic device according to claim 17, wherein the preset acquisition condition comprises at least one of:

the target object being present in a field of view of the acquisition unit;

an acquisition control being triggered; and a display duration of the target object in the field of view reaching a preset duration threshold.

19. The electronic device according to claim 17, wherein the adjusting target display information of a corresponding sub-grid in the three-dimensional grid to be processed based on a relative acquisition angle between the acquisition unit and the three-dimensional grid to be processed comprises:

adjusting a relative acquisition angle between the acquisition unit and the target object, and determining an acquisition position of the acquisition unit;

determining a target sub-grid to be processed based on the acquisition position and display information of each sub-grid in the three-dimensional grid to be processed; and determining a projection center point of the acquisition unit in a plane in which the target sub-grid to be processed resides, and adjusting display information of the target sub-grid to be processed to the target display information upon detecting that the projection center point is within a preset projection threshold range, wherein the preset projection threshold range is determined based on a grid center point of a corresponding sub-grid to be processed.

20. A non-transitory storage medium, with computer-executable instructions stored thereon, wherein the computer-executable instructions, when executed by a processor, cause the processor to:

start an acquisition unit upon receiving an instruction for acquiring a three-dimensional model corresponding to a target object;

generate, in response to meeting a preset acquisition condition, a three-dimensional grid to be processed enclosing the target object, and display the three-dimensional grid to be processed on a display interface of a device to which the acquisition unit belongs;

adjust target display information of a corresponding sub-grid in the three-dimensional grid to be processed based on a relative acquisition angle between the acquisition unit and the three-dimensional grid to be processed; and wherein the computer-executable instructions further cause the processor to:

correspondingly send a serial number of a target sub-grid to be processed whose display information is updated as the target display information and acquired object data to a target device.

* * * * *